(12) United States Patent
Turani et al.

(10) Patent No.: US 8,960,384 B2
(45) Date of Patent: Feb. 24, 2015

(54) METHOD FOR MAKING A CERAMIC MATRIX MATERIAL FOR FRICTION COMPONENTS OF BRAKES AND CERAMIC MATRIX MATERIAL MADE BY SUCH METHOD

(75) Inventors: Simone Turani, Bergamo (IT); Konstantin Vikulov, Bergamo (IT); Massimiliano Valle, Bergamo (IT); Marco Orlandi, Milan (IT)

(73) Assignee: Freni Brembo S.p.A., Curno, Bergamo (IT)

( * ) Notice: Subject to any disclaimer, the term of this patent is extended or adjusted under 35 U.S.C. 154(b) by 994 days.

(21) Appl. No.: 13/056,076

(22) PCT Filed: Aug. 8, 2008

(86) PCT No.: PCT/IT2008/000543
§ 371 (c)(1),
(2), (4) Date: Mar. 22, 2011

(87) PCT Pub. No.: WO2010/016079
PCT Pub. Date: Feb. 11, 2010

(65) Prior Publication Data
US 2011/0308899 A1    Dec. 22, 2011

(51) Int. Cl.
*F16D 69/02*    (2006.01)
*C04B 35/571*   (2006.01)
*C04B 38/00*    (2006.01)
(Continued)

(52) U.S. Cl.
CPC ............ *F16D 69/025* (2013.01); *C04B 35/571* (2013.01); *C04B 38/0022* (2013.01); *C04B 2111/00362* (2013.01); *F16D 65/092* (2013.01); *F16D 69/027* (2013.01); *F16D 2069/001* (2013.01); *F16D 2069/0441* (2013.01); *F16D 2069/0483* (2013.01); *F16D 2200/0039* (2013.01); *F16D 2200/0043* (2013.01);
(Continued)

(58) Field of Classification Search
CPC ................ F16D 2200/0039; F16D 2200/0043; F16D 2200/0047
USPC .......................................... 188/251 A, 251 R
See application file for complete search history.

(56) References Cited

U.S. PATENT DOCUMENTS

| | | | |
|---|---|---|---|
| 5,128,494 A | | 7/1992 | Blum |
| 5,339,931 A | * | 8/1994 | Jacko et al. ............... 188/251 M |
| 5,635,250 A | * | 6/1997 | Blum et al. .................... 427/387 |
| 6,062,351 A | | 5/2000 | Strasser et al. |

(Continued)

FOREIGN PATENT DOCUMENTS

| | | |
|---|---|---|
| EP | 0699728 | 3/1996 |
| GB | 781686 | 8/1957 |
| WO | 99/27266 | 6/1999 |

*Primary Examiner* — Anna Momper
(74) *Attorney, Agent, or Firm* — Shoemaker and Mattare

(57) ABSTRACT

Method for making a ceramic matrix material for brake friction components, in particular disc brakes, including the following operational phases: a) prepare a mixture of at least one siliconic type ceramic precursor, particles of hard materials suitable as abrasives, particles of substances suitable as lubricants and particles of metal materials; b) hot-press the mixture to obtain a green body; c) submit the green body to a process of pyrolysis in order to achieve ceramisation of the preceramic binder, thus obtaining a ceramic matrix material. The mixture includes a catalyst suitable for favoring reticulation of the ceramic precursor during the hot-pressing phase and the pyrolysis process is carried out at temperatures below 800° C., more precisely between 400° C. and 600° C.

37 Claims, 4 Drawing Sheets

(51) Int. Cl.
*F16D 65/092* (2006.01)
*C04B 111/00* (2006.01)
*F16D 69/00* (2006.01)
*F16D 69/04* (2006.01)

(52) U.S. Cl.
CPC . *F16D2200/0086* (2013.01); *F16D 2200/0069* (2013.01)
USPC .................................. 188/251 A; 188/251 R

(56) References Cited

U.S. PATENT DOCUMENTS

| | | | |
|---|---|---|---|
| 6,350,713 B1 * | 2/2002 | Petrak | 501/95.2 |
| 6,936,341 B2 * | 8/2005 | Huner et al. | 428/293.4 |
| 2003/0094716 A1 | 5/2003 | Gadkaree et al. | |
| 2004/0262104 A1 * | 12/2004 | Ono et al. | 188/251 A |
| 2006/0244165 A1 * | 11/2006 | Huang | 264/29.5 |

* cited by examiner

US 8,960,384 B2

METHOD FOR MAKING A CERAMIC MATRIX MATERIAL FOR FRICTION COMPONENTS OF BRAKES AND CERAMIC MATRIX MATERIAL MADE BY SUCH METHOD

FIELD OF APPLICATION

This invention concerns a method for making a ceramic matrix material for friction components of brakes, in particular disc brakes, as well as a ceramic matrix material produced by this method.

This invention further concerns a method for making disc brake pads incorporating the said ceramic matrix material.

STATE OF THE ART

Ceramic matrix materials are widely used for making friction components of brakes.

Over and above good performances in terms of friction coefficient and wear resistance, ceramic matrix materials, given their characteristics of refractoriness, mean a reduction in heat transmission from the disc to the hydraulic braking system in comparison with friction materials obtained for example by sinterisation of metal powders.

Many production techniques can be employed for making ceramic matrix materials, such as techniques of fusion and sinterisation of powders.

A recently spreading technique is based on pyrolysis of ceramic polymer precursors (polymer pyrolysis), normally consisting of organic siliconic polymers (containing silicium) such as polysilanes, polycarbosilanes, polysilazanes and polysiloxanes.

This technique involves a process of heating a mixture of siliconic ceramic precursors and appropriate fillers in a controlled or inert atmosphere (e.g. argon flow) at temperatures greater than 800° C. to achieve the passage from organic to inorganic polymeric structure, with the formation of silicium oxycarbides and/or silicium carbides or nitrides (SiC or $Si_3N_4$). The above precursors normally have high ceramic yields: more than 50% of initial polymer weight is maintained in the final material.

Compared with other techniques pyrolysis offers various advantages both from a strictly operational viewpoint and in the characteristics of the final product.

In particular, compared with the fusion technique the pyrolysis technique allows better control of the form and purity of the final product and the possibility of working at lower temperatures (800-1500° C.).

An example of the production process for friction material with ceramic matrix by means of polymeric pyrolysis is described in U.S. Pat. No. 6,062,351. The friction material is made by setting out from a mixture of one or more organic ceramic precursors (carbosil-siliconic resin), reinforcing fibres (e.g. fibres of carbon, alumina, silicium nitrite or carbide) and fillers (e.g. powders of silicium carbide, graphite, alumina, mullite, silica, titanium oxide, silicium or boron nitride). The mixture is then cold-compacted in a mould. There follows a heating phase within the mould itself for polymerisation of the ceramic precursor and the obtaining of a green body. The green body then undergoes pyrolysis in an inert atmosphere at temperatures between 800° C. and 1.100° C.

In accordance with a special form of implementation of the process described in U.S. Pat. No. 6,062,351, the pyrolysis operational cycle envisages a first phase of heating from ambient temperature to approximately 150° C. at a speed of around 2° C./min, followed by a second heating phase to 400° C. at a speed of 0.4° C./min The third and fourth heating phases are, respectively, to 760° C. at a speed of 0.18° C./min and to 870° C. at a speed of 0.46° C./min. The product is then maintained at 870° C. for about 4 hours and then cooled to ambient temperature at a speed of approximately 1.2° C. per minute. The heating phase requires an overall time of approximately 48 hours and the cooling phase about 12 hours.

One of the main limitations of polymeric pyrolysis applied to the production of friction materials with ceramic matrix is the need to work with low heating speeds. This means a long work process since the pyrolysis phase alone may require a few dozen hours. Working at low heating speeds is necessary in order to limit detrimental thermal stresses which, favouring the natural phenomenon of material shrinkage and the formation of microporosity due to the release of volatile organic substances during pyrolysis, could lead to the formation of micro-cracks with the risk of failure of the final material.

In the disc brake pad production process, on completion of the pyrolysis phase the ceramic matrix material normally undergoes refinishing and grinding before being glued or mechanically attached (e.g. with bolts or rivets) to a support plate.

The support plate is generally in metal (steel) capable of bearing the compression and flexion stresses that typically occur during braking.

One limitation of the pyrolysis technique, in common moreover with the fusion technique, concerns the impossibility of obtaining the final friction component already directly bonded with the metal support plate. Pyrolysis temperatures (greater than 800° C.) would in fact lead to unacceptable deformations of the metal support plates traditionally employed.

This necessarily involves bonding the friction component with the plate only on completion of the pyrolysis phase. So in the production cycle a specific phase of assembly of the plate and the friction component must be envisaged, a phase that may be preceded by grinding and refinishing of the latter component.

SUMMARY OF THE INVENTION

The purpose of this invention is therefore to eliminate the drawbacks of the well known technique described above by supplying a process for the creation of a ceramic matrix friction material based on polymeric pyrolysis which envisages considerable reduction in working time while producing a ceramic matrix friction material whose performances, in terms of friction coefficient and wear resistance, are at least equivalent to those of traditional ceramic matrix friction materials.

A further purpose of this invention is to supply a ceramic matrix friction material whose performances, in terms of friction coefficient value and wear resistance, are superior to those of traditional ceramic matrix friction materials.

A further purpose of this invention is to supply a method for making disc brake pads which simplifies bonding of the friction component in ceramic matrix material and the metal support plate.

BRIEF DESCRIPTION OF THE DRAWINGS

The technical features of the invention—in accordance with the foregoing purposes—may be clearly seen in the contents of the claims listed below, and its advantages are made even clearer in the detailed description that follows, given with reference to the attached drawings which represent one or more forms of the invention, purely by way of example and not limitative, in which:

DETAILED DESCRIPTION OF THE INVENTION

Figure 1:
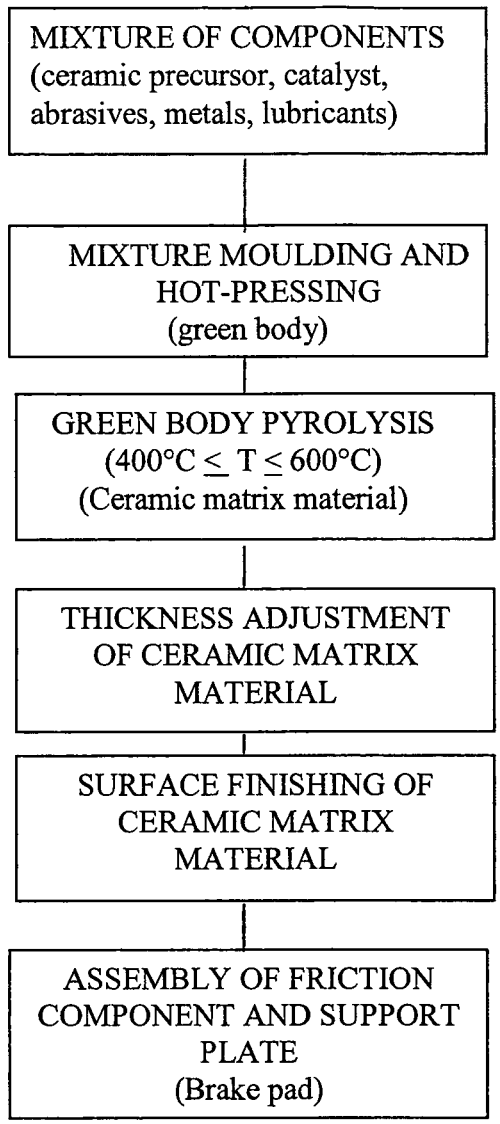
FIG. 1 and FIG. 2 show a diagram of, respectively, a first and a second applicative form of the method in accordance with the invention.

This invention concerns a method for making a ceramic matrix material particularly suitable for friction components of brakes, such as the friction portions of disc brake pads.

As will be detailed below, the ceramic matrix friction material produced in accordance with the method of the invention may be used for the production of pads that cooperate tribologically both with disc brakes in composite ceramic material (CCM) and with disc brakes in grey cast iron, ensuring optimal performances in terms of wear resistance, friction and running-in (understood as the time taken to achieve optimal functioning conditions).

In particular, with regard to performances in terms of friction, it is pointed out that in comparison with traditional materials there is an increase in the mean value of the friction coefficient, correlated with its stability in time. It is further pointed out that the friction coefficient value at start of braking lies within the required operational intervals.

The invention moreover concerns a method for creating disc brake pads incorporating the ceramic matrix material.

As will be resumed in detail below, the invention method permits direct bonding of the friction component of a disc brake pad with the related metal support elements (metal support plate) during the production phases of the friction component itself (in ceramic matrix material) without the need to envisage a specific final assembly phase.

In accordance with a general implementation of the invention, the method of making a ceramic matrix material for brake friction components comprises the following operational phases:

a) prepare a mixture of at least one siliconic type ceramic precursor, of particles of hard materials suitable as abrasives, of particles of substances suitable as lubricants and particles of metal materials;

b) hot-press the mixture to obtain a green body;

c) subject the green body to a process of pyrolysis in order to obtain ceramisation of the preceramic binder, thus obtaining a ceramic matrix material.

In accordance with a first aspect characterising the invention, the mixture comprises a catalyst suitable for favouring reticulation of the ceramic precursor during the hot-pressing phase.

A suitable catalyst in the initial mixture for the reactions of reticulation of the ceramic precursor (reactions of hydrolysis and condensation in the polymeric chain) permits achievement of a highly accelerated reticulation of the ceramic precursor precisely on completion of the pressing phase and therefore the creation of an extensive ramified polymeric structure within the green body.

Accelerated reticulation of the precursor carries a series of advantages.

The green body obtained at the end of the hot-pressing phase has such properties of mechanical resistance as to make it easy to manipulate, with simplification of the subsequent work process phases.

The extensive ramified polymeric structure created during the pressing phase has the effect of "restraining" the ceramic precursor molecules during the pyrolysis phase, reducing their volatility and therefore increasing the ceramic yield.

This extensive ramified structure involves—at least partially—the particles of the additives in the initial mixture (abrasives, lubricants, metals) which are thus incorporated into the structure itself, with advantages both in terms of performances (absolute value and stability of the friction coefficient) and of wear resistance, as will be reprised below.

The extensive ramified polymeric structure is maintained in the ceramic matrix material, although modified following the chemical-physical transformations induced by the pyrolysis process, and ensures that the final ceramic matrix material too will have good properties of mechanical resistance, with special reference to wear resistance, to the elastic module and to compressibility.

In accordance with another aspect characterising the invention, the pyrolysis process is carried out at temperatures below 800° C.

The good mechanical properties that the extensive ramified polymeric structure gives the green body mean that the degree of progress of the pyrolysis process (temperature and times) can be tailored as required. This in turn means that the degree of ceramisation in the final ceramic matrix material can be planned in function of the latter's performance characteristics.

As will be resumed below, it was surprisingly found that pyrolysis at temperatures below 800° C. (and especially between 400° C. and 600° C.) results in considerable improvement in friction material performances.

Figure 3:
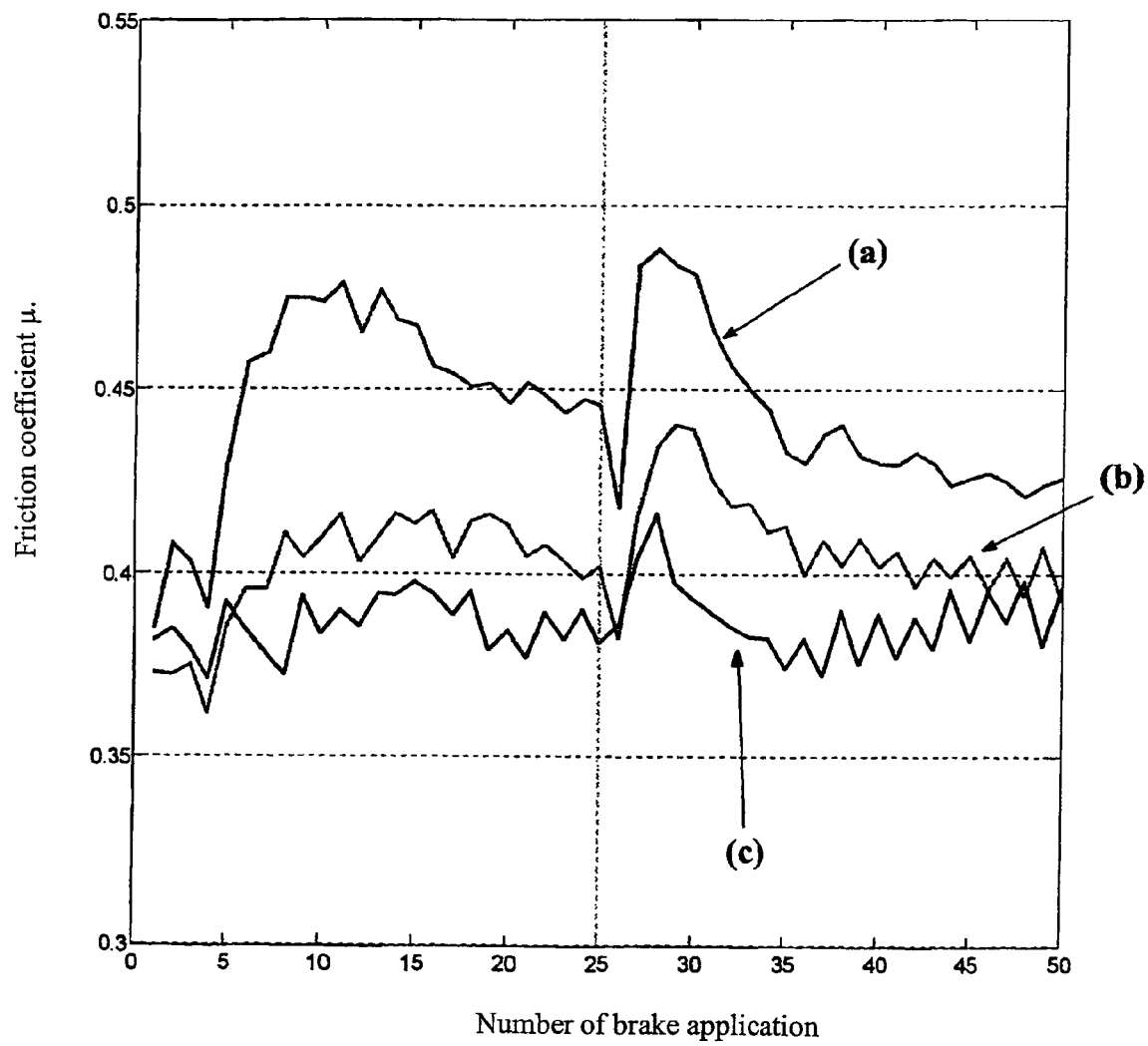
FIG. 3 represents the trend of the friction coefficient in function of the number of braking operations for three ceramic matrix friction components (two of which in accordance with the invention) that differ in particular in the maximum temperature at which pyrolysis was carried out.

The graphs in FIG. 3 show the results of braking tests (friction coefficient in function of number of braking operations) carried out on three different disc brake pads. Curves (a) and (b) refer to two pads created in accordance with the invention, with maximum pyrolysis temperatures of respectively 500° C. and 700° C. Curve (c) refers to a traditional pad with maximum pyrolysis temperature of 900° C.

A comparison of the graphs shows the increase of the friction coefficient in the pads produced as per the invention, an increase that is more marked in the pads created with a pyrolysis temperature between 400° C. and 600° C.

As for wear resistance, the tests showed that on average the pads produced as per the invention have greater resistance to wear: an average wear value of approximately 0.005 mm/braking operation as against an average value of approximately 0.015 mm/braking operation in traditional type pads (made with pyrolysis temperatures above 800° C.).

As mentioned above, in its most general form of application the method of the invention comprises at least one first phase of mixing the basic components, a second phase of hot-pressing the mixture and a third phase of pyrolysis of the green body (or moulded body).

The phase of mixing the basic components of the ceramic matrix material should preferably be done in a horizontal blade mixer. However other types of mixers may be envisaged, depending on the characteristics and quantities of the components to be mixed.

In accordance with a preferable applicative solution for the invention method, the phase of mixing the various components takes place in two stages.

In the first stage the polymeric ceramic precursor is mixed with the appropriate catalyst (for reticulation reactions) in the absence of the other components. In this way a more homogeneous mixture is obtained in terms of catalyst distribution and therefore (on completion of the pressing phase) a reticulation of the precursor spread throughout the mass of the material.

Most favourably, this first mixing stage is carried out for sufficient time to ensure suitable mixing, preferably between 1 and 3 minutes.

In the second mixing stage all the other components are added to the precursor-catalyst mixture: abrasives, lubricants and metal materials.

Most favourably, this second mixing stage is carried out for sufficient time to ensure suitable mixing, preferably between 3 and 5 minutes.

The hot-pressing phase is preferably carried out with a vertical press operating in compression on a steel mould.

Preferably, in cases where it is intended to directly bond the friction component to a metal support (e.g. disc brake pad support plate) during the production phases of the ceramic matrix material, the mould should be a plate (or matrix) with a through aperture and a perimeter section corresponding to the form to be given to the body in ceramic matrix material (e.g. the friction portion of the pad). The plate-matrix may be equipped with one, two or more apertures.

The operation begins by blocking one end of the through aperture (preferably the lower one, with reference to a horizontal orientation of the plate-matrix in the press) using the head of the punch with which the press is equipped. The aperture (which defines a loading chamber) is then filled with the mixture. The upper end is then closed with a metal plate of shape and thickness appropriately selected in function of the pad applications. With the plate suitably locked in position pressing is begun by actuating the punch. The temperature inside the mould is measured with thermocouples inserted in the mould itself.

Presses and moulds other than the one described above may be envisaged.

Jointly with or separately from what is described above, during the hot-pressing phase the pressures exerted on the material in the mould should preferably be between 250 and 500 Kg/cm².

It was surprisingly discovered that application of pressures within the range specified above has beneficial effects on the performances of the final ceramic matrix material in terms of wear resistance, friction and running-in (understood as the time taken to achieve optimal functioning conditions).

An improvement in performance linked to application of pressures as specified above during pressing was noted independently of the pyrolysis process operational conditions.

An ameliorating synergic effect was also noted on final ceramic matrix material performance through combining the pyrolysis process at temperatures below 800° C. (and in particular between 400° C. and 600° C.) and the application of pressing pressures between 250 and 500 Kg/cm².

Jointly with or separately from the application of pressures between 250 and 500 Kg/cm², the pressing phase should preferably be carried out at temperatures between 120° C. and 150° C. to permit fluidification of the ceramic precursor and the achievement of viscosity values such as to facilitate close contact and bonding between the precursor and the other components of the mixture.

Jointly with or separately from what is described above, the pressing phase should preferably be carried out with alternate cycles of application and release of force.

In accordance with a special applicative form of the method the pressing phase envisages three consecutive cycles of application and release of force, each lasting about 30 seconds (15 seconds of application and 15 seconds of release). There follows a final phase of continuous application of force for approximately 90-210 seconds. The overall pressing phase requires a period of time that varies between 3 and 5 minutes. The pressing times and temperatures allow the well fluidified ceramic precursor to spread homogeneously to all portions of the mould and among the particles of the various mix components.

In accordance with an especially favoured implementation, the support plate is co-pressed with the mixture of precursor, catalyst and filler and then undergoes pyrolysis together with the green body.

Carrying out pyrolysis (in accordance with the invention) at temperatures below 800° C., and in particular between 400° C. and 600° C., makes the operation expedient and feasible. In fact the metal support plate can bear the thermal stresses deriving from the pyrolysis process without undergoing unacceptable heat deformations.

Thanks to the invention method it is therefore possible to directly bond the support plate to the green body, hence to the ceramic matrix material, during the friction material production phases. On completion of the friction material creation phases we therefore have a friction material/plate assembly which facilitates the subsequent work processes of finishing and of any application of mechanical fixing means.

As already mentioned, a characterising aspect of the invention is that the pyrolysis process in carried out at temperatures below 800° C.

It was noted that the best results in terms of improving friction material performances are obtained by carrying out the pyrolysis process in such a way as to reach maximum temperatures between 400 and 600° C.

Most favourably, the pyrolysis process is carried out envisaging a time at maximum temperature between 3 and 5 hours, and preferably 4 hours.

During the pyrolysis process the speed of heating the green body from ambient temperature to maximum temperature should preferably be between 4 and 6° C./min, preferably 5° C./min.

The pyrolysis process should preferably be carried out in an isothermal kiln.

Most favourably, with view to avoiding oxidative phenomena that would alter the ceramisation processes, pyrolysis is carried out in an inert atmosphere.

The inert atmosphere should preferably be created with a flow of argon or nitrogen, in cases where the formation of silicium oxycarbides is preferred (with general formula $SiO_xC_y$) in the ceramic matrix material.

Different atmospheres may also be envisaged, for example in ammonia flow, in cases where the formation of silicium oxynitrides is desired (with general formula $SiO_xN_y$) in the ceramic matrix material.

In accordance with a special applicative form of the invention illustrated in the diagram in FIG. 1, the support plate is bonded to the already created friction material. On completion of the pyrolysis phase there may be a phase of adjustment of the thickness of the green body in ceramic matrix material and, alternatively or additionally, a surface finishing phase for the ceramic matrix body.

The essential purpose of these phases is to prepare the ceramic matrix material body in such a way that it can be subsequently coupled—in accordance with envisaged tolerances—with support elements (e.g. a metal support plate) in order to create a disc brake pad.

The method may also envisage, on completion of the above phases of adjustment and/or surface refinishing phases, a phase of assembly of the friction component with a metal support plate by means of suitable fixing elements such as bolts, rivets or glue.

Most favourably the surface finishing phase should be carried out after the phase of assembling the friction component and the support plate.

Figure 2:
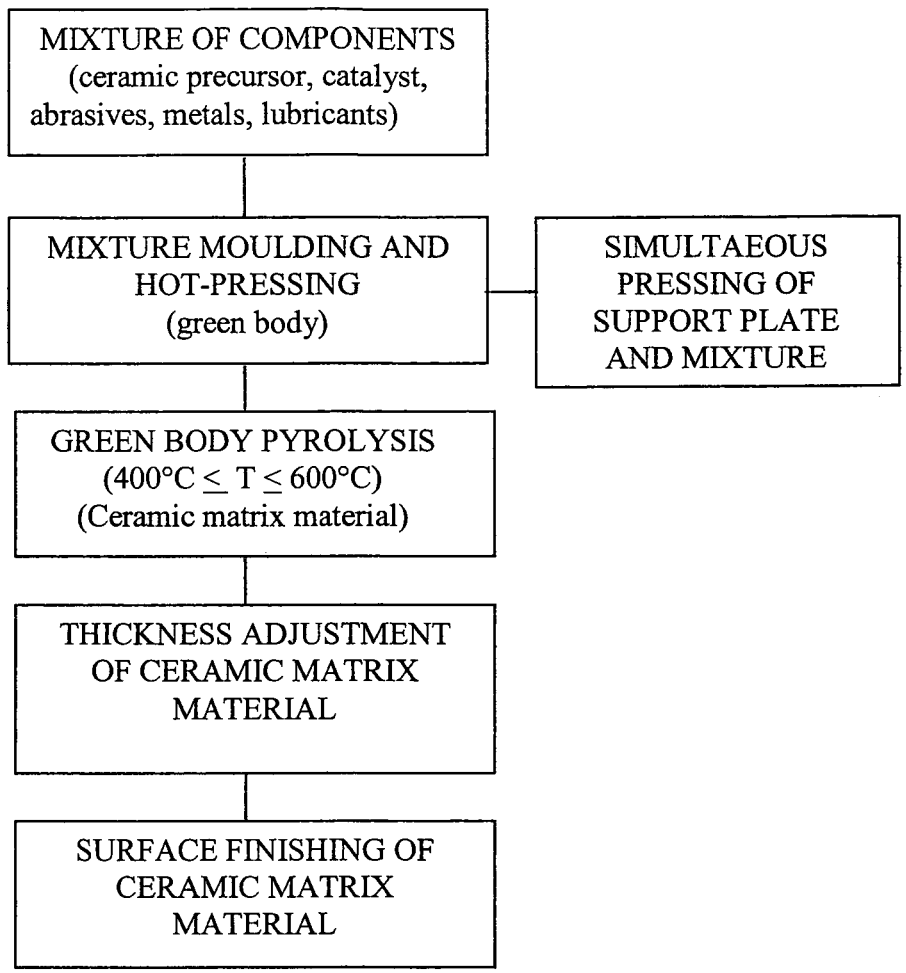

In accordance with an especially preferred applicative form of the invention (already mentioned above and illustrated in FIG. 2) the elements supporting the friction component are bonded to the latter directly during the phases of creating the friction material.

On completion of the pyrolysis phase there may be a phase of thickness adjustment of the green body in ceramic matrix material and, alternatively or additionally, an operational phase of surface refinishing of the ceramic material body on the exposed and not covered parts of the plate.

Most favourably, it is therefore no longer necessary to envisage a final phase of assembly with the support plate but where necessary only a final phase of fixing during which special fixing elements may be applied where necessary (e.g. bolts or rivets), operating on the already coupled friction component and metal plate, with considerable simplification of the operations.

In accordance with a general applicative solution for the invention, the mixture to be pressed is composed as follows (percentages expressed in weight with regard to the mixture): ceramic precursor and catalyst between 5 and 10%; abrasives between 20% and 30%; metal materials not greater than 60%; lubricants not greater than 50%.

As mentioned above, the ceramic polymeric precursor is of a siliconic type and may in particular be selected from the group including polysilanes, polycarbosilanes, polysilazanes and polysiloxanes with general formula $[—R_{1...2}Si(C,N,B,O)_{0.5...1.5}—]_n$.

Preferably the precursor should be selected from the polysiloxanes, independently of the substituting functional groups and of the degree of ramification of the polymer, with general formula $[—RSiO_{1.5}—]_n$, where R indicates hydrogen or an organic functional group (alkylic, acrylic etc).

Even more preferably, the precursor should be selected from the sesquisiloxanes and in particular the polymethylsesquisiloxanes.

Mixtures of two or more different organic precursors may be envisaged.

Most favourably, the ceramic precursor's weight percentage in the mixture is between 6% and 9%.

Preferably the catalyst should be selected from organic coordination compounds with metals selected from the group including zinc, copper, aluminium, iron, zirconium, vanadium, chromium, manganese, cobalt, nickel and titanium.

Most favourably, the catalyst is selected from the acetonates, the beta-dicetonates and the carboxylates. An especially preferred catalyst is zinc or zirconium acetylacetonate.

Most favourably, the catalyst is present with a stoichiometric percentage with regard to the ceramic precursor, preferably a percentage between 0.15% and 0.3% of the mixture weight.

Preferably the ceramic precursor and catalyst used should be in powder form. But components in other forms, such as fluids, may also be used.

Preferably the abrasives comprise of powdered silicium carbide. However other materials with hardness properties such as to function as abrasives may also be used, such as for example boron carbide, silicium, zircon, zirconium oxide (zirconia), periclase, corundum and spinel.

For simplicity in the description of abrasives below explicit reference will be made only to silicium carbide, but this should not be considered limitative. In fact the information concerning silicium carbide should be extended to other abrasives such as the ones listed above.

Most favourably, silicium carbide is in the form of powder in two different particle sizes.

The ratio between the average diameters of the two powders is between 9 and 11, and preferably 10.

Average diameter of a powder is intended as the value corresponding to $d_{50}$ of the particle size distribution curve. In the following description, reference will be made to the definitions of powders employed by the FEPA (European Federation of Abrasives Manufacturers).

The differentiated particle size of the silicium carbide powder means that a compatibly sized abrasive can be supplied to all the remaining components of the mixture. The finest powder blends with the fine lubricants and ceramic precursor (binder resin) while the large particle powder blends with the larger sized metal particles. This favours compaction of the material.

It is further noted that the finer powder blends and tends to homogenise with the remaining material while the larger particle powder remains "detached" from the other components of the mixture.

So it may be seen that the two different particle sizes result in abrasives that operate at different energy levels, to the advantage of final friction material performances. When the smaller particle size abrasives wear out there is a progressive "crumbling" of the larger particle size abrasives. This results in an averagely constant presence of smaller particle size abrasives.

Preferably the silicium carbide powders in the two different particle sizes should have average diameters between 1 µm and 600 µm.

In accordance with a general applicative form of the invention, the weight ratio between the silicium carbide powders of greater and lesser particle size is between 0.8 and 1.8.

As will be reprised below, should the ceramic matrix friction material be required to cooperate tribologically with a disc brake in composite ceramic material the weight ratio between larger and smaller particle size silicium carbide powder should be between 0.8 and 1.2, preferably 1.

Should the ceramic matrix friction material be required to cooperate tribologically with a disc brake in grey cast iron the weight ratio between larger and smaller particle size silicium carbide powder should be between 1.2 and 1.8, preferably 1.5.

In accordance with a preferable applicative form of the invention, the metal particles comprise particles in iron and/or iron alloy.

Most favourably, metal particles replacing or in addition to particles in iron and/or iron alloy comprise of particles in copper and/or brass.

Preferably the particles in copper and brass, individually or mixed, are present in a percentage of less than 20% of mixture weight.

The term "particle" is intended to comprise parts of materials in the form of both powders and fibres.

As regards particles in ferrous materials, steel wool is especially preferred.

Preferably the metal particles (iron, iron alloys, copper and/or brass) in powder form should have an average diameter of less than 300 µm, whereas metal particles in fibre form (iron, iron alloys, copper and/or brass) should have an average diameter of less than 100 µm and a length of less than 1 mm.

In accordance with a preferable applicative form of the invention the lubricants comprise of graphite in powder.

Most favourably, in replacement of or in addition to powdered graphite, the lubricants may comprise powdered coke, tin sulphide and/or tin.

Preferably the percentage of graphite should be between 9% and 13% of mixture weight while powdered coke, tin sulphide and tin (where envisaged) should have weights of less than 35%, 10% and 5% respectively with regard to the mixture.

Most favourably, as will be reprised in the attached examples, the use of powdered coke, tin sulphide and/or tin in combination with graphite powders reduces the graphite content, bringing it towards the lower extreme of the interval specified above.

Most favourably, graphite and/or coke powders have an average diameter between 200 µm and 800 µm while tin sulphide and/or tin powders have an average diameter of less than 100 µm.

As mentioned previously, the ceramic matrix friction material produced with the invention method may be used to manufacture pads that cooperate tribologically with disc brakes in composite ceramic material (CCM) or in grey cast iron, guaranteeing optimum performance in both cases in terms of value of friction coefficient stability and wear resistance.

Should the invention's ceramic matrix material be required to cooperate with discs in grey cast iron, the mixture undergoing the pressing phase should have the following general composition (percentages expressed in weight with regard to the mixture): ceramic precursor and catalyst between 5 and 10%; abrasives between 20% and 30%; metal materials between 25% and 60%; lubricants between 10% and 50%.

In greater detail, in accordance with a specific implementation, the weight ratio between the silicium carbide powder with greater particle size and the powder of lesser particle size should be between 1.2 and 1.8, and preferably 1.5.

The greater size particle powdered silicon carbide (SiC) is present in a percentage between 12% and 18% of mixture weight while the percentage of finer SiC powder is between 6% and 12% of mixture weight.

The metal particles comprise of powdered iron, from 5% to 20% of mixture weight, steel wool from 5% to 30% of mixture weight and (where envisaged) copper and/or brass powder and/or fibres in percentages less than 20% of mixture weight.

Overall the particles (powder and fibres) of iron and/or iron alloys weigh between 5% and 60% of mixture weight.

Graphite, preferably in powder form, constitutes between 9% and 12% of mixture weight. Where coke is envisaged the percentage is less than 35% of mixture weight, whereas tin sulphide and tin (where envisaged), preferably in powder form, should be less than 10% and 5% of mixture weight respectively.

When graphite is the only lubricant the percentage should preferably be 12% of mixture weight. By way of example the addition of 3% weight of tin powder permits reducing the graphite to 10%.

* * *

There follow descriptions of three specific examples of making ceramic matrix materials, in accordance with the invention, to cooperate with discs in grey cast iron.

EXAMPLE 1

Mix 780 grams of polymethyl-sesquisiloxane resin $(CH_3-SiO_{3/2})_n$ in Wacker-Belsil® PMS MK Powder (softening interval 50-60° C.) and 20 grams of powdered zinc acetylacetonate in a horizontal blade mixer for approximately 2 minutes. Then add 1.500 grams of powdered SiC class FEPA F36 (average diameter 525 µm) and 1.000 grams of powdered SiC class FEPA F220 (average diameter 58 µm). Continue by adding 1.800 grams of copper in powder, 2.700 grams of steel wool, 1.000 grams of iron in powder and lastly 1.200 grams of graphite in powder. The second phase of mixing is protracted for approximately 4 minutes.

The mixture's overall composition is as follows (percentages expressed in weight with regard to the mixture): 15% of powdered SiC F36; 10% powdered SiC F220; 18% copper in powder; 27% steel wool; 10% iron in powder; 12% graphite in powder; 7.8% polymethyl-sesquisiloxane resin; 0.2% zinc acetylacetonate.

The copper and iron powders have an average diameter of approximately 200 µm and approximately 250 µm respectively. The steel wool has an average diameter of approximately 80 µm and an average length of approximately 0.8 mm. The graphite powder has an average diameter of approximately 600 µm.

A portion of the mixture thus obtained then undergoes a hot-pressing phase in a vertical press in order to obtain the green body, as well as the accelerated reticulation of the polymethyl-sesquisiloxane resin. The mixture and a steel plate are pressed simultaneously.

In greater detail: a plate (or matrix) with a through aperture and a substantially rectangular perimeter section corresponding to the form to be given to the body in ceramic matrix material. The aperture has an area of approximately 60 cm² and a depth of approximately 8 cm.

The operation begins by blocking the lower end of the through aperture, using the head of the punch with which the press is equipped. The aperture is then filled with the mixture and the upper end closed with a metal plate about 5 mm thick. With the plate suitably locked in position, pressing is begun by actuating the punch.

The temperature inside the mould (measured by means of thermocouples) is maintained around 120° C. The maximum pressure applied during pressing is around 400 Kg/cm². Three consecutive cycles of application and release of force are envisaged, each lasting about 30 seconds (15 seconds of application and 15 seconds of release). There follows a final phase of continuous application of force (without release) for approximately 150 seconds. The overall pressing phase requires a period of approximately 4 minutes.

The green body obtained on completion of the pressing phase has a thickness of approximately 16 mm, to which the (unvaried) thickness of the plate must be added.

There follows a phase of pyrolysis in an isothermal kiln with nitrogen flow of approximately 0.2 m³/h. The green body is heated from ambient temperature (25° C.) to approximately 500° C. at a speed of approximately 5° C./min and kept at 500° C. for approximately 4 hours.

The ceramic matrix material thus obtained has a thickness of approximately 16 mm (excluding the thickness of the steel plate) and weighs approximately 300 grams.

The body then undergoes finishing work in order to bring the thickness to 14 or 15 mm, depending on the end use of the pad.

EXAMPLE 2

Mix 780 grams of polymethyl-sesquisiloxane resin $(CH_3-SiO_{3/2})_n$ in Wacker-Belsil® PMS MK Powder (softening interval 50-60° C.) and 20 grams of powdered zinc acetylacetonate in a horizontal blade mixer for approximately 2 minutes. Then add 1.500 grams of powdered SiC class FEPA F100 (average diameter 129 μm) and 1.000 grams of powdered SiC class FEPA F500 (average diameter $d_{50}$ 12.8 μm). Continue by adding 1.800 grams of brass in powder, 2.700 grams of steel wool, 900 grams of iron in powder, 1.000 grams of graphite in powder and lastly 300 grams of tin in powder. The second phase of mixing is protracted for approximately 4 minutes.

The mixture's overall composition is as follows (percentages expressed in weight with regard to the mixture): 15% of powdered SiC F100; 10% powdered SiC F500; 18% brass in powder; 27% steel wool; 9% iron in powder; 10% graphite in powder; 3% tin in powder; 7.8% polymethyl-sesquisiloxane resin; 0.2% zinc acetylacetonate.

The brass and iron powders have an average diameter of approximately 250 μm and approximately 200 μm respectively. The steel wool has an average diameter of approximately 80 μm and an average length of approximately 0.6 mm. The graphite and tin powders have an average diameter of approximately 400 μm and approximately 80 μm respectively.

A portion of the mixture thus obtained then undergoes a hot-pressing phase in a vertical press in order to obtain the green body, as well as the accelerated reticulation of the sesquisiloxane resin. The mixture and a steel plate are pressed simultaneously.

In greater detail: a plate (or matrix) with a through aperture and a substantially rectangular perimeter section corresponding to the form to be given to the body in ceramic matrix material. The aperture has an area of approximately 60 cm² and a depth of about 8 cm.

The operation begins by blocking the lower end of the through aperture, using the head of the punch with which the press is equipped. The aperture is then filled with the mixture and the upper end closed with a metal plate about 5 mm thick. With the plate suitably locked in position, pressing is begun by actuating the punch.

The temperature inside the mould is maintained around 130° C. The maximum pressure applied during pressing is around 450 Kg/cm². Three consecutive cycles of application and release of force are envisaged, each lasting about 30 seconds (15 seconds of application and 15 seconds of release). There follows a final phase of continuous application of force (without release) for approximately 210 seconds. The overall pressing phase requires a period of approximately 5 minutes.

The green body obtained on completion of the pressing phase has a thickness of approximately 16 mm, to which the (unvaried) thickness of the plate must be added.

There follows a phase of pyrolysis in an isothermal kiln with nitrogen flow of approximately 0.2 m³/h. The green body is heated from ambient temperature (25° C.) to approximately 400° C. at a speed of approximately 6° C./min and kept at 400° C. for approximately 4 hours and 30 minutes.

The ceramic matrix material thus obtained has a thickness of approximately 16 mm (excluding the thickness of the steel plate) and weighs approximately 300 grams.

The body in ceramic matrix material then undergoes finishing work in order to bring the thickness to 14 or 15 mm, depending on the end use of the pad.

EXAMPLE 3

Mix 780 grams of cyclopentasiloxane resin Wacker-Belsil® RG100 and 20 grams of powdered zinc acetylacetonate in a horizontal blade mixer for approximately 2 minutes. Then add 1.300 grams of powdered SiC class FEPA F46 (average diameter 370 μm) and 800 grams of powdered SiC class FEPA F280 (average diameter $d_{50}$ 36.5 μm). Continue by adding 2.500 grams of steel wool, 300 grams of iron in powder, 1.000 grams of graphite in powder, 3.000 grams of coke in powder and lastly 300 grams of tin in powder. The second phase of mixing is protracted for approximately 4 minutes.

The mixture's overall composition is as follows (percentages expressed in weight with regard to the mixture): 13% powdered SiC F46; 8% powdered SiC F280; 25% steel wool; 3% iron in powder; 10% graphite in powder; 30% coke in powder; 3% tin in powder; 7.8% siliconic resin; 0.2% zinc acetylacetonate.

The iron powder has an average diameter of approximately 150 μm. The steel wool has an average diameter of approximately 60 μm and an average length of approximately 0.5 mm. The graphite, coke and tin powders have an average diameter of approximately 700 μm, approximately 600 μm and approximately 90 μm respectively.

A portion of the mixture thus obtained then undergoes a hot-pressing phase in a vertical press in order to obtain the green body, as well as the accelerated reticulation of the siloxanic resin. The mixture and a steel plate are pressed simultaneously.

In greater detail: a plate (or matrix) with a through aperture and a substantially rectangular perimeter section corresponding to the form to be given to the body in ceramic matrix material. The aperture has an area of approximately 60 cm² and a depth of about 8 cm.

The operation begins by blocking the lower end of the through aperture, using the head of the punch with which the press is equipped. The aperture is then filled with the mixture and the upper end closed with a metal plate about 5 mm thick. With the plate suitably locked in position, pressing is begun by actuating the punch.

The temperature inside the mould is maintained around 150° C. The maximum pressure applied during pressing is around 350 Kg/cm². Three consecutive cycles of application and release of force are envisaged, each lasting about 30 seconds (15 seconds of application and 15 seconds of release). There follows a final phase of continuous application of force (without release) for approximately 210 seconds. The overall pressing phase requires a period of approximately 5 minutes.

The green body obtained on completion of the pressing phase has a thickness of approximately 16 mm, to which the (unvaried) thickness of the plate must be added.

There follows a phase of pyrolysis in an isothermal kiln with nitrogen flow of approximately 0.2 m³/h. The green body is heated from ambient temperature (25° C.) to approximately 600° C. at a speed of approximately 4° C./min and kept at 600° C. for approximately 3 hours and 30 minutes.

The ceramic matrix material thus obtained has a thickness of approximately 16 mm (excluding the thickness of the steel plate) and weighs approximately 300 grams.

The body in ceramic matrix material then undergoes finishing work in order to bring the thickness to 14 or 15 mm, depending on the end use of the pad.

* * *

Should the ceramic matrix material as per the invention be required to function with discs in CCM, the mixture for the pressing phase has the following general composition (percentages expressed in weight with regard to the mixture): ceramic precursor and catalyst between 5 and 10%; abrasives between 20% and 30%; metal materials between 30% and 60%; lubricants between 10% and 40%.

In greater detail, in accordance with a specific implementation, the weight ratio between the silicium carbide powder with greater particle size and the powder of lesser particle size should be between 0.8 and 1.2, and preferably 1.

The greater size particle powdered silicium carbide (SiC) is present in a percentage between 10% and 15% of mixture weight.

The metal particles comprise of steel wool from 20% to 30% of mixture weight (which may be wholly or partly replaced by powdered iron) and (where envisaged) copper and/or brass powder and/or fibres in percentages less than 20% of mixture weight.

Unlike the ceramic matrix material for cooperation with discs in grey cast iron, the material for discs in CCM also comprises silicium among the particles, preferably in powder form.

Most favourably, silicium powder is present with a weight percentage between 9 and 11% of the mixture, preferably 10%.

The silicium powder preferably has an average diameter of less than 50 µm.

Graphite, preferably in powder form, constitutes between 11% and 13% of mixture weight, preferably 12%. Where coke is envisaged the percentage is less than 20% of mixture weight, whereas tin sulphide and tin (where envisaged), preferably in powder form, should be less than 10% and 5% of mixture weight respectively.

* * *

There follow descriptions of three specific examples of making ceramic matrix materials, in accordance with the invention, to cooperate with discs in composite ceramic material (CCM).

EXAMPLE 4

Mix 780 grams of polymethyl-sesquisiloxane resin $(CH_3—SiO_{3/2})_n$ in Wacker-Belsil® PMS MK Powder (softening interval 50-60° C.) and 20 grams of powdered zinc acetylacetonate in a horizontal blade mixer for approximately 2 minutes. Then add 1.200 grams of powdered SiC class FEPA F46 (average diameter 370 µm) and 1.300 grams of powdered SiC class FEPA F280 (average diameter 36.5 µm). Continue by adding 1.800 grams of copper in powder, 2.700 grams of steel wool, 1.000 grams of silicium in powder and lastly 1.200 grams of graphite in powder. The second phase of mixing is protracted for approximately 4 minutes.

The mixture's overall composition is as follows (percentages expressed in weight with regard to the mixture): 12% of powdered SiC F46; 13% powdered SiC F280; 18% copper in powder; 27% steel wool; 10% silicium in powder; 12% graphite in powder; 7.8% sesquisiloxane resin; 0.2% zinc acetylacetonate.

The copper and silicium powders have an average diameter of approximately 150 µm and approximately 40 µm respectively. The steel wool has an average diameter of approximately 50 µm and an average length of approximately 0.4 mm. The graphite powder has an average diameter of approximately 300 µm.

A portion of the mixture thus obtained then undergoes a hot-pressing phase in a vertical press in order to obtain the green body, as well as the accelerated reticulation of the sesquisiloxane resin. The mixture and a steel plate are pressed simultaneously.

In greater detail: a plate (or matrix) with a through aperture and a substantially rectangular perimeter section corresponding to the form to be given to the body in ceramic matrix material. The aperture has an area of approximately 148 cm² and a depth of about 8 cm.

The operation begins by blocking the lower end of the through aperture, using the head of the punch with which the press is equipped. The aperture is then filled with the mixture and the upper end closed with a metal plate about 5 mm thick. With the plate suitably locked in position, pressing is begun by actuating the punch.

The temperature inside the mould is maintained around 120° C. The maximum pressure applied during pressing is around 300 Kg/cm². Three consecutive cycles of application and release of force are envisaged, each lasting about 30 seconds (15 seconds of application and 15 seconds of release). There follows a final phase of continuous application of force (without release) for approximately 90 seconds. The overall pressing phase requires a period of approximately 3 minutes.

The green body obtained on completion of the pressing phase has a thickness of approximately 16 mm, to which the (unvaried) thickness of the plate must be added.

There follows a phase of pyrolysis in an isothermal kiln with nitrogen flow of approximately 0.2 m³/h. The green body is heated from ambient temperature (25° C.) to approximately 500° C. at a speed of approximately 5° C./min and kept at 500° C. for approximately 4 hours.

The ceramic matrix material thus obtained has a thickness of approximately 16 mm (excluding the thickness of the steel plate) and weighs approximately 710 grams.

The body in ceramic matrix material then undergoes finishing work in order to bring the thickness to 14 or 15 mm, depending on the end use of the pad.

EXAMPLE 5

Mix 780 grams of polymethyl-sesquisiloxane resin $(CH_3—SiO_{3/2})_n$ in Wacker-Belsil® PMS MK Powder (softening interval 50-60° C.) and 20 grams of powdered zinc acetylacetonate in a horizontal blade mixer for approximately 2 minutes. Then add 1.200 grams of powdered SiC class FEPA F54 (average diameter 310 µm) and 1.300 grams of powdered SiC class FEPA F320 (average diameter $d_{50}$ 29.2 µm). Continue by adding 1.000 grams of silicium in powder, 2.700 grams of steel wool, 1.200 grams of graphite in powder and lastly 1.800 grams of coke in powder. The second phase of mixing is protracted for approximately 4 minutes.

The mixture's overall composition is as follows (percentages expressed in weight with regard to the mixture): 12% powdered SiC F54; 13% powdered SiC F320; 27% steel wool; 10% silicium in powder; 12% graphite in powder; 18% coke in powder; 7.8% sesquisiloxane resin; 0.2% zinc acetylacetonate.

The silicium powder has an average diameter of approximately 35 µm. The steel wool has an average diameter of approximately 70 µm and an average length of approximately 0.6 mm. The graphite and coke powders have an average diameter of approximately 500 µm.

A portion of the mixture thus obtained then undergoes a hot-pressing phase in a vertical press in order to obtain the green body, as well as the accelerated reticulation of the sesquisiloxane resin. The mixture and a steel plate are pressed simultaneously.

In greater detail: a plate (or matrix) with a through aperture and a substantially rectangular perimeter section corresponding to the form to be given to the body in ceramic matrix material. The aperture has an area of approximately 148 cm² and a depth of about 8 cm.

The operation begins by blocking the lower end of the through aperture, using the head of the punch with which the press is equipped. The aperture is then filled with the mixture and the upper end closed with a metal plate about 5 mm thick. With the plate suitably locked in position, pressing is begun by actuating the punch.

The temperature inside the mould is maintained around 130° C. The maximum pressure applied during pressing is approximately 250 Kg/cm². Three consecutive cycles of application and release of force are envisaged, each lasting about 30 seconds (15 seconds of application and 15 seconds of release). There follows a final phase of continuous application of force (without release) for approximately 150 seconds. The overall pressing phase requires a period of approximately 4 minutes.

The green body obtained on completion of the pressing phase has a thickness of approximately 16 mm, to which the (unvaried) thickness of the plate must be added.

There follows a phase of pyrolysis in an isothermal kiln with nitrogen flow of approximately 0.2 m³/h. The green body is heated from ambient temperature (25° C.) to approximately 550° C. at a speed of approximately 5° C./min and kept at 550° C. for approximately 4 hours.

The ceramic matrix material thus obtained has a thickness of approximately 16 mm (excluding the thickness of the steel plate) and weighs approximately 710 grams.

The body in ceramic matrix material then undergoes finishing work in order to bring the thickness to 14 or 15 mm, depending on the end use of the pad.

EXAMPLE 6

Mix 780 grams of cyclopentasiloxane resin Wacker-Belsil® RG100 and 20 grams of powdered zinc acetylacetonate in a horizontal blade mixer for approximately 2 minutes. Then add 1.200 grams of powdered SiC class FEPA F40 (average diameter 438 µm) and 1.300 grams of powdered SiC class FEPA F240 (average diameter $d_{50}$ 44.5 µm). Continue by adding 1.500 grams of brass in powder 2.100 grams of steel wool, 1.000 grams of silicium in powder, 1.200 grams of graphite in powder and lastly 300 grams of tin sulphide in powder. The second phase of mixing is protracted for approximately 4 minutes.

The mixture's overall composition is as follows (percentages expressed in weight with regard to the mixture): 12% powdered SiC F40; 13% powdered SiC F240; 21% steel wool; 15% brass in powder; 10% silicium in powder; 12% graphite in powder; 9% tin sulphide in powder; 3% tin in powder; 7.8% siliconic resin; 0.2% zinc acetylacetonate.

The brass and silicium powders have an average diameter of approximately 200 µm and approximately 45 µm respectively. The steel wool has an average diameter of approximately 80 µm and an average length of approximately 0.8 mm. The graphite and tin sulphide powders have an average diameter of approximately 750 µm and approximately 90 µm respectively.

A portion of the mixture thus obtained then undergoes a hot-pressing phase in a vertical press in order to obtain the green body, as well as the accelerated reticulation of the siloxane resin. The mixture and a steel plate are pressed simultaneously.

In greater detail: a plate (or matrix) with a through aperture and a substantially rectangular perimeter section corresponding to the form to be given to the body in ceramic matrix material. The aperture has an area of approximately 148 cm² and a depth of about 8 cm.

The operation begins by blocking the lower end of the through aperture, using the head of the punch with which the press is equipped. The aperture is then filled with the mixture and the upper end closed with a metal plate about 5 mm thick. With the plate suitably locked in position, pressing is begun by actuating the punch.

The temperature inside the mould is maintained around 130° C. The maximum pressure applied during pressing is around 450 Kg/cm². Three consecutive cycles of application and release of force are envisaged, each lasting about 30 seconds (15 seconds of application and 15 seconds of release). There follows a final phase of continuous application of force (without release) for approximately 210 seconds. The overall pressing phase requires a period of approximately 5 minutes.

The green body obtained on completion of the pressing phase has a thickness of approximately 16 mm, to which the (unvaried) thickness of the plate must be added.

There follows a phase of pyrolysis in an isothermal kiln with nitrogen flow of approximately 0.2 m³/h. The green body is heated from ambient temperature (25° C.) to approximately 450° C. at a speed of approximately 5° C./min and kept at 450° C. for approximately 4 hours and 30 minutes.

The ceramic matrix material thus obtained has a thickness of approximately 16 mm (excluding the thickness of the steel plate) and weighs approximately 710 grams.

The body in ceramic matrix material then undergoes finishing work in order to bring the thickness to 14 or 15 mm, depending on the end use of the pad.

* * *

On completion of the pressing phase all the ceramic matrix materials obtained following examples 1 to 3 and 4 to 6 above demonstrated such excellent consistency as to facilitate the achievement of good details (e.g. sharp edges of the pad) and manipulation without particular difficulties. On completion of the pyrolysis phase the materials evinced good properties of mechanical resistance (mechanical resistance module between 12 and 18 MPa; elastic module between 5 and 10 GPa). The average density of the materials was between 2.9 and 3.2 g/cm³. The average degree of ceramisation was evaluated at approximately 70%.

* * *

Braking tests were carried out on the brake pads made as per the invention with view to evaluating performances in terms of friction coefficient, of coefficient stability in function of the number of brake applications and of wear resistance.

The tests consisted in subjecting the samples to series of 50 braking operations.

The tests were carried out using braking systems equipped with discs in both cast iron and composite ceramic material (CCM).

The tests showed no important differences in behaviour between the application with cast iron discs and the application with discs in CCM.

The tests revealed overall an average friction coefficient of approximately 0.45 from the fifth to the thirtieth application of the brakes. The value is fairly variable, with a minimum of approximately 0.42 and a maximum of approximately 0.48. After the thirtieth application of the brakes the friction coefficient decreased slightly, settling at an average value of approximately 0.42. For each application of the brakes there was average wear of approximately 0.005 mm.

Figure 4:
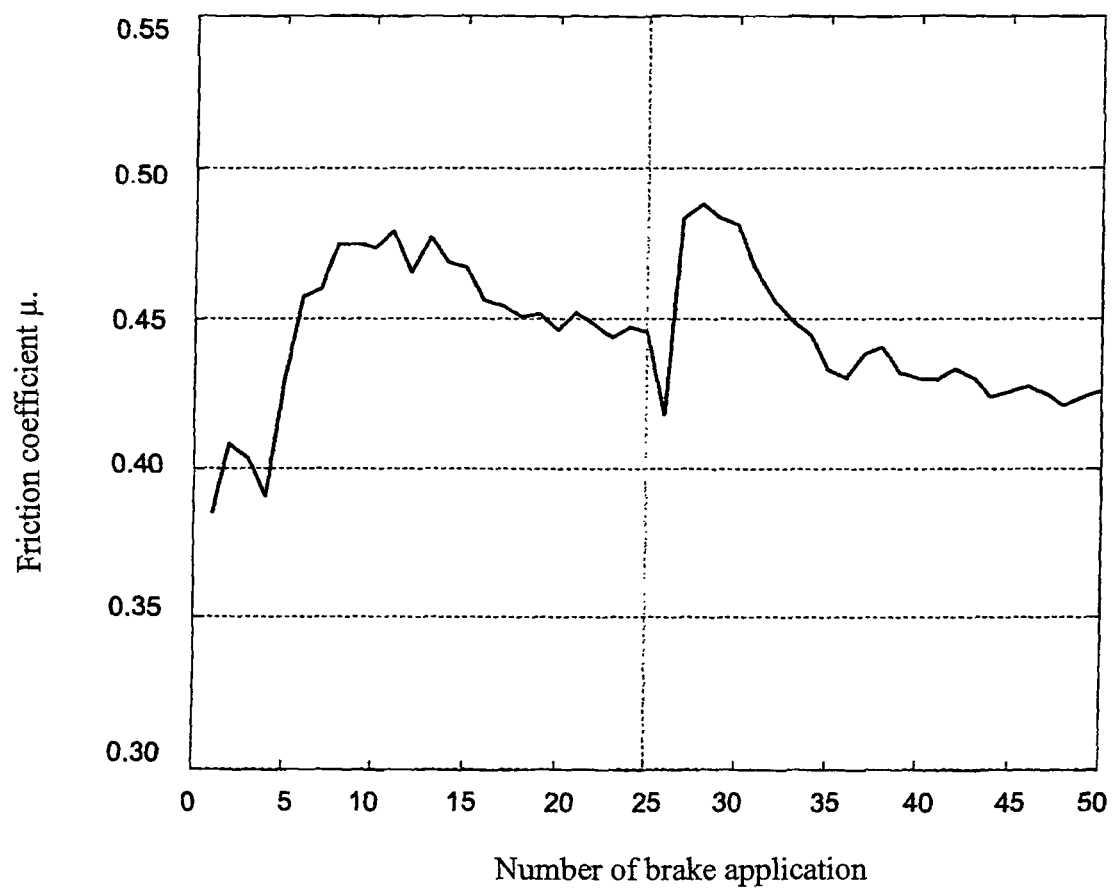
FIG. 4 represents the trend of the friction coefficient in function of the number of braking operations for a ceramic matrix friction component created in accordance with a special applicative form of the invented method.

The graph in FIG. 4 (number of brake application in abscissa and friction coefficient value in ordinate) regards tests carried out on a system with cast iron disc and a pad whose friction component is in the ceramic matrix material of Example 1 above.

This invention concerns a method for making disc brake pads, including a friction component in ceramic matrix material and a metal support element for the friction component.

In greater detail: the method envisages the following general operational phases:—making the friction component in ceramic matrix material;—bonding the friction component to the support element.

The method is characterized by the fact that the phase of creating the friction component is carried out as per the procedure described above and by the fact that the support element is directly bonded with the ceramic matrix material in formation.

Preferably the support element should be pressed simultaneously with the initial ceramic matrix material during the hot-pressing phase referred to above.

This invention therefore considerably reduces working time for the production of a friction component in ceramic matrix material: from an average overall time of approximately 60-80 hours (without considering assembly with the metal support) to an average time of approximately 8-12 hours.

The ceramic matrix friction material made with the method proposed in the invention offers performances, in terms of friction coefficient and wear resistance, that are at least equivalent if not superior to those of traditional ceramic matrix friction materials. The friction coefficient found in the invention materials is in fact on average 0.42-0.45 as against the values of traditional materials, which are approximately 0.35-0.4.

Analogous considerations are valid with regard to wear resistance. In the invention materials, average wear values are approximately 0.005 mm/brake application, as against the values of traditional materials that are approximately 0.015-0.020.

The invention method moreover permits simplification of brake pad and metal support plate production by cutting out the specific phase of final assembly of friction component in ceramic matrix material and metal support plate.

Thus conceived, the invention has achieved its initial goals.

Obviously in its practical implementation it may take on forms and configurations different from what is illustrated above, but without for this reason being excluded from the present context of protection.

Furthermore, all the details may be replaced by technically equivalent elements, and the sizes, forms and materials employed may be substituted in accordance with necessities.

The invention claimed is:

1. A method for making a ceramic matrix material for friction components for brakes, said method comprising the following operational phases:
    preparing a mixture of at least one siliconic type ceramic precursor, with particles of hard abrasive materials, lubricant particles and particles of metal materials; hot-pressing the mixture to obtain a green body;
    submitting said green body to a process of pyrolysis in order to achieve ceramisation of the preceramic binder, thus obtaining said ceramic matrix material;
    wherein said mixture comprises a catalyst favoring reticulation of said ceramic precursor during said hot-pressing phase and wherein said pyrolysis phase is carried out at temperatures below 800° C.,
    in which said pressing phase is carried out at pressures between 250 and 500 kg/cm$^2$ and said pyrolysis process is carried out at maximum temperatures between 400 and 600° C.

2. A method according to claim 1 in which said pressing phase is carried out at temperatures between 120° C. and 150° C.

3. A method according to claim 1 in which the pyrolysis process envisages a period of time at maximum temperature, between 3 and 5 hours.

4. A method according to claim 1 in which the pyrolysis process envisages a heating speed, from ambient temperature to maximum temperature, of 4 to 6° C./min.

5. A method according to claim 1 in which said mixture comprises between 5 and 10% in weight of ceramic precursor and catalyst, between 20% and 30% of abrasive particles, less than 60% of metal particles and less than 50% of lubricant particles.

6. A method according to claim 1 in which said ceramic precursor (at least one) is selected from the polysiloxanes.

7. A method according to claim 1 in which said catalyst is selected from organic coordination compounds with metals selected from the group that comprises zinc, copper, aluminium, iron, zirconium, vanadium, chromium, manganese, cobalt, nickel and titanium.

8. A method according to claim 1 in which said abrasive particles are powders of silicon carbide, boron carbide, silicon, zircon, zirconium oxide (zirconia), periclase, corundum or spinel.

9. A method according to claim 1 in which the abrasive particles are in the form of powders of two different particle sizes, the ratio between the average diameters of the two powders being between 9 and 11.

10. A method according to claim 9 in which the particles of abrasive powders, in said two different particle sizes, have an average diameter of between 1 μm and 600 μm.

11. A method according to claim 9 in which the weight ratio between the powder of abrasives with greater particles size and the powder with lesser particle size in between 0.8 and 1.8.

12. A method according to claim 1 in which said metal particles comprise particles of iron, iron alloy, copper, brass and/or mixtures thereof.

13. A method according to claim 1 in which said lubricant particles comprise powders selected in the group consisting of graphite, coke, tin sulphide, tin and mixtures thereof.

14. A method according to claim 1 in which said mixture comprises between 5 and 10% in weight of ceramic precursor and catalyst, between 20% and 30% of abrasive particles, between 30% and 60% of metal particles and between 10% and 40% of lubricant particles.

15. A method according to claim 14 in which said abrasive particles comprise silicon powder.

16. A method according to claim 15 in which silicon powder is present in a weight percentage between 9 and 11% of said mixture.

17. A method according to claim 15 in which the silicon powder has an average diameter of less than 50 μm.

18. A method according to claim 14 in which the metal materials comprise particles of iron and/or iron alloys, said particles of iron and/or iron alloys being present in a weight percentage between 20% and 30% of said mixture.

19. A method according to claim 14, in which the abrasive particles are in the form of powders of two different particle sizes, the weight ratio between abrasive powders of greater and lesser particle size being between 0.8 and 1.2.

20. A method according to claim 14 in which said lubricant particles comprise graphite, which is present in a percentage between 11% and 13% of said mixture weight.

21. A method according to claim 14 in which said lubricant particles comprise coke, which is present in a percentage less than 20% of said mixture weight.

22. Ceramic matrix material for friction components of disc brakes, for tribological cooperation with brake discs, in composite ceramic material, said ceramic matrix material being made by the method according to claim 14.

23. Disc braking system comprising at least one brake disc in composite ceramic material and a pad equipped with at least one friction component to cooperate tribologically with said disc, said friction component comprising a ceramic matrix material made in accordance with the method according to claim 14.

24. A method according to claim 1 in which said mixture comprises between 5 and 10% in weight of ceramic precursor and catalyst, between 20% and 30% of abrasive particles, between 25% and 60% of metal particles and between 10% and 50% of lubricant particles.

25. A method according to claim 24 in which said metal particles comprise particles of iron and/or iron alloys, said particles in iron and/or iron alloys being present in a weight percentage between 5% and 60% of said mixture.

26. A method according to claim 24 in which the particles of abrasives are in the form of powders of two different particle sizes, the weight ratio between abrasive powders of greater and lesser particle size being between 1.2 and 1.8.

27. A method according to claim 24 in which said lubricant particles comprise graphite, which is present in a percentage between 9% and 12% of said mixture weight.

28. A method according to claim 24 in which said lubricant particles comprise coke, which is present in a percentage less than 35% of said mixture weight.

29. Ceramic matrix material for friction components of disc brakes, for tribological cooperation with brake discs, in cast iron, said ceramic matrix material being made by the method according to claim 24.

30. Disc braking system comprising at least one brake disc in cast iron and a pad equipped with at least one friction component to cooperate tribologically with said disc, said friction component comprising a ceramic matrix material made in accordance with the method according to claim 24.

31. A method according to claim 1 in which, during said hot-pressing phase of said mixture, the mixture is pressed directly on a support element.

32. Ceramic matrix material for friction components of disc brakes, made with the method according to claim 1.

33. Disc brake pad, including a friction component in ceramic matrix material and a metal support element for said friction component, said ceramic matrix material being made in accordance with the method according to claim 1.

34. Disc braking system including at least one brake disc and a pad equipped with at least one friction component to cooperate tribologically with said disc, said friction component comprising a ceramic matrix material made in accordance with the method according to claim 1.

35. A method for making disc brake pads, said pads comprising at least one friction component in ceramic matrix material and a metal support element for said friction component, said method comprising the following operational phases: creating said friction component in material that comprises a ceramic matrix material; assembling said friction component and said support element;
wherein the phase of creating the friction component is carried out in accordance with the method according to claim 1 and wherein said ceramic matrix material is pressed simultaneously with said support element during said hot-pressing phase.

36. A method for making a ceramic matrix material for friction components for brakes, said method comprising the following operational phases:
preparing a mixture of at least one siliconic type ceramic precursor, with particles of hard abrasive materials; lubricant particles and particles of metal materials; hot-pressing said mixture to obtain a green body; submitting said green body to a process of pyrolysis in order to achieve ceramisation of said preceramic binder, thus obtaining said ceramic matrix material;
wherein said pressing phase is carried out with pressures between 250 and 500 kg/cm$^2$.

37. Ceramic matrix material for friction components of disc brakes, made with the method according to claim 36.

* * * * *